Aug. 30, 1932.  J. GLUCK ET AL  1,874,962
TAXIMETER CONSTRUCTION
Filed Aug. 28, 1930  9 Sheets-Sheet 4
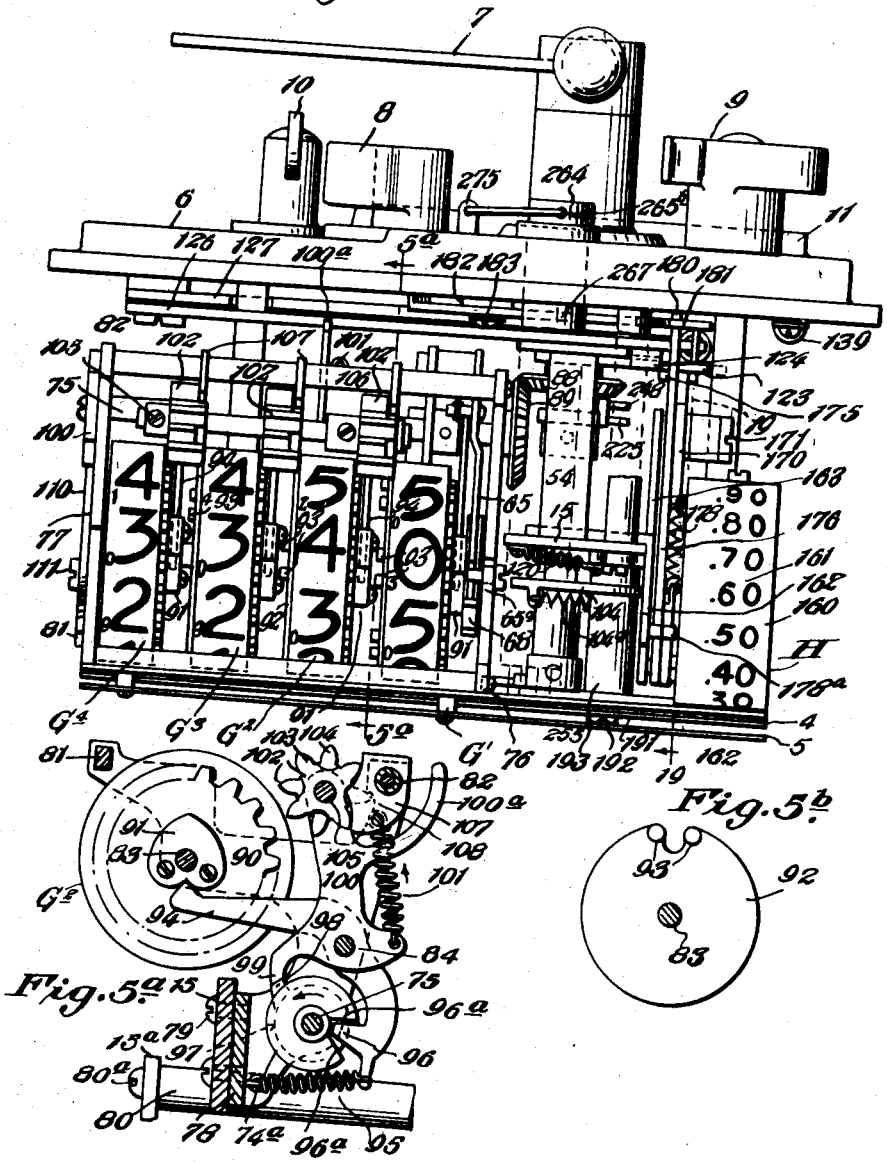
Inventors
Julius Gluck
Rudolph R. Karich
By Hastings W. Baker
Attorney

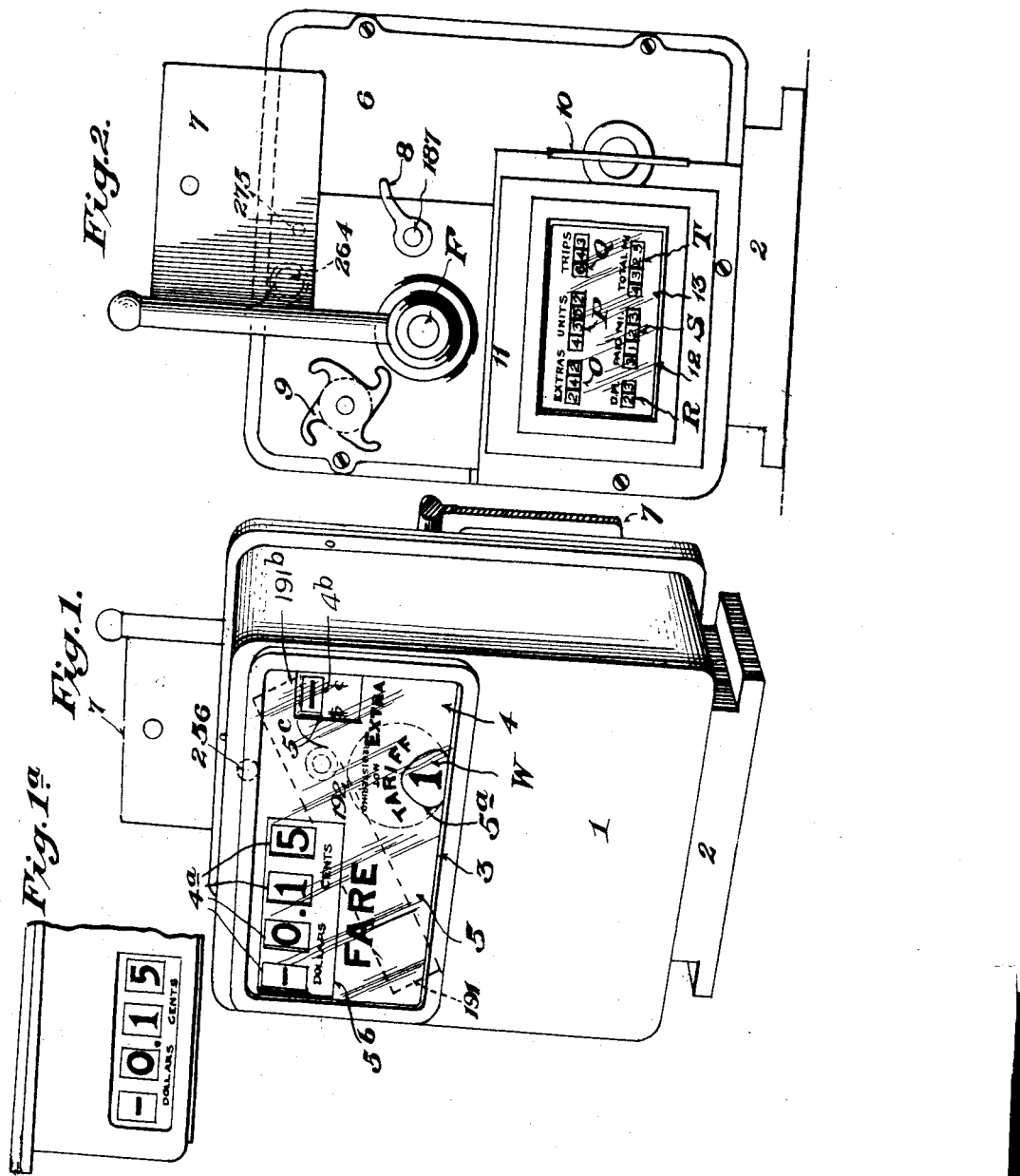
Aug. 30, 1932.
J. GLUCK ET AL
1,874,962
TAXIMETER CONSTRUCTION
Filed Aug. 28, 1930
9 Sheets-Sheet 1
Inventors
Julius Gluck
Rudolph R. Karich
By Hastings W. Baker
Attorney

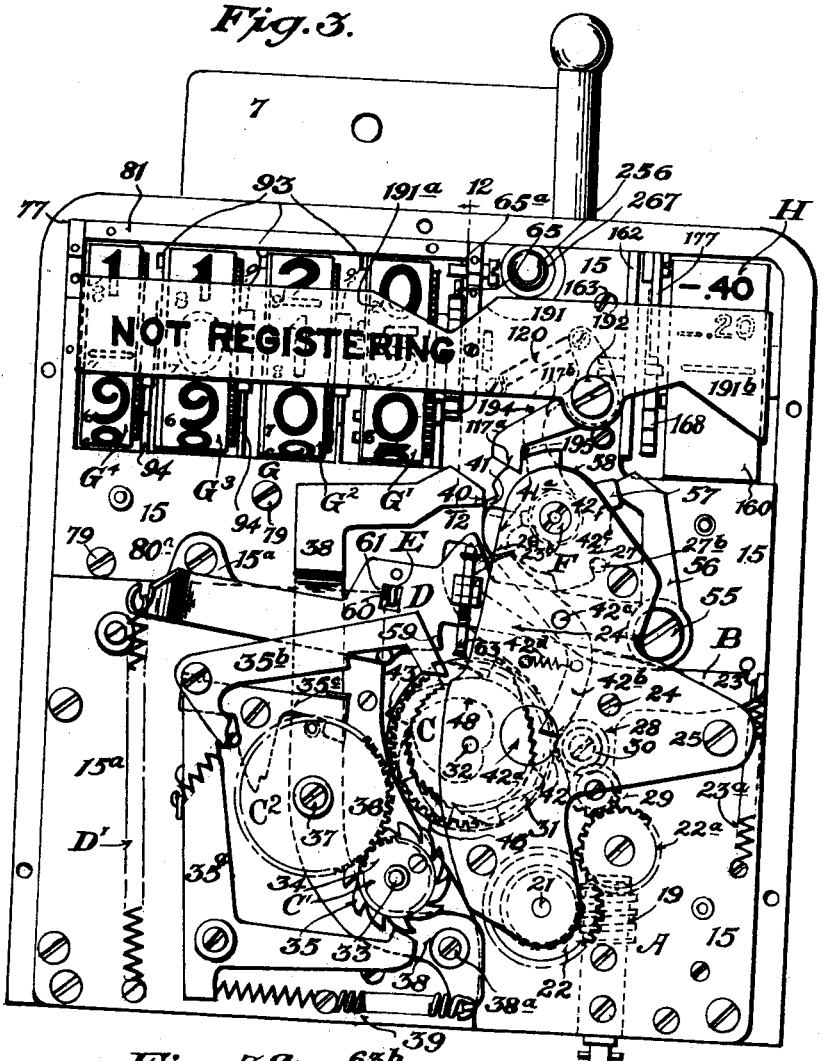
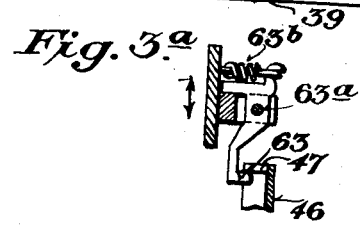

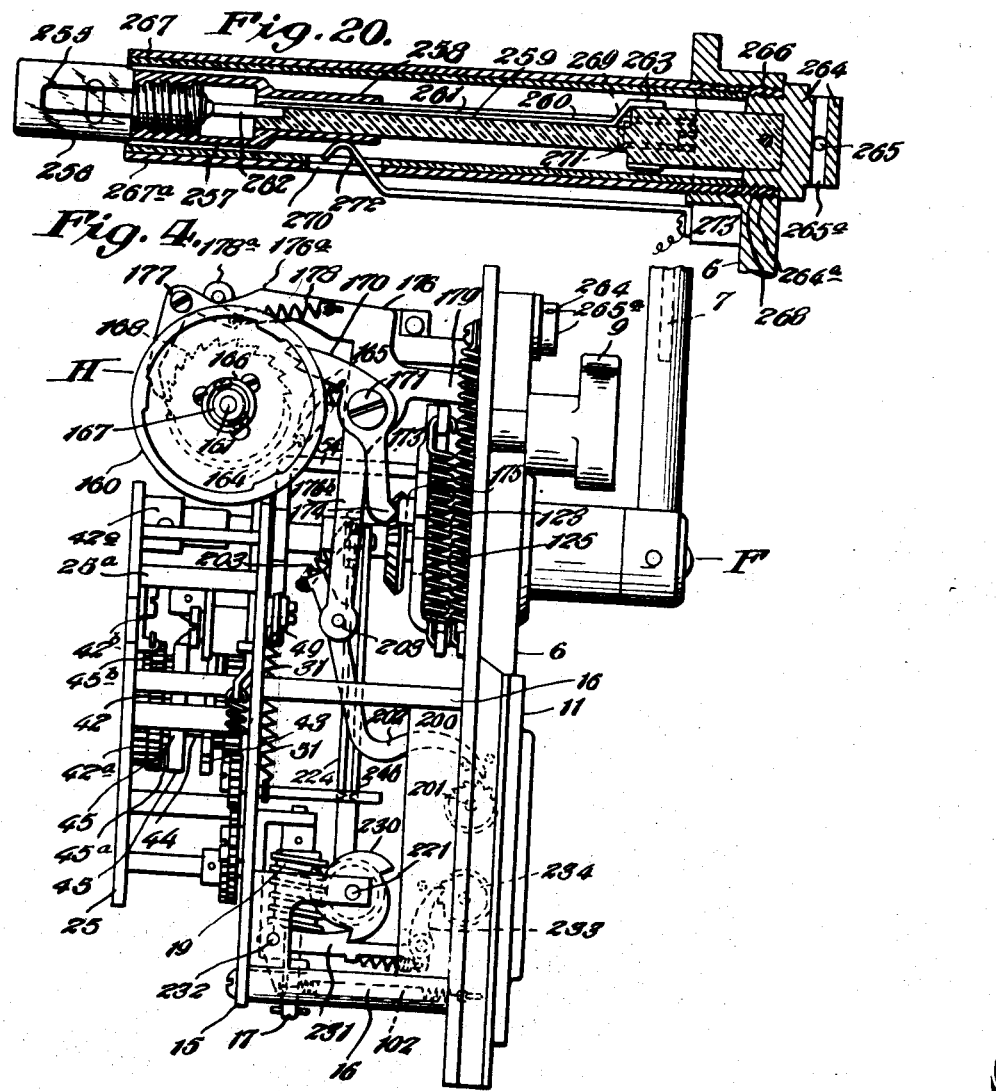

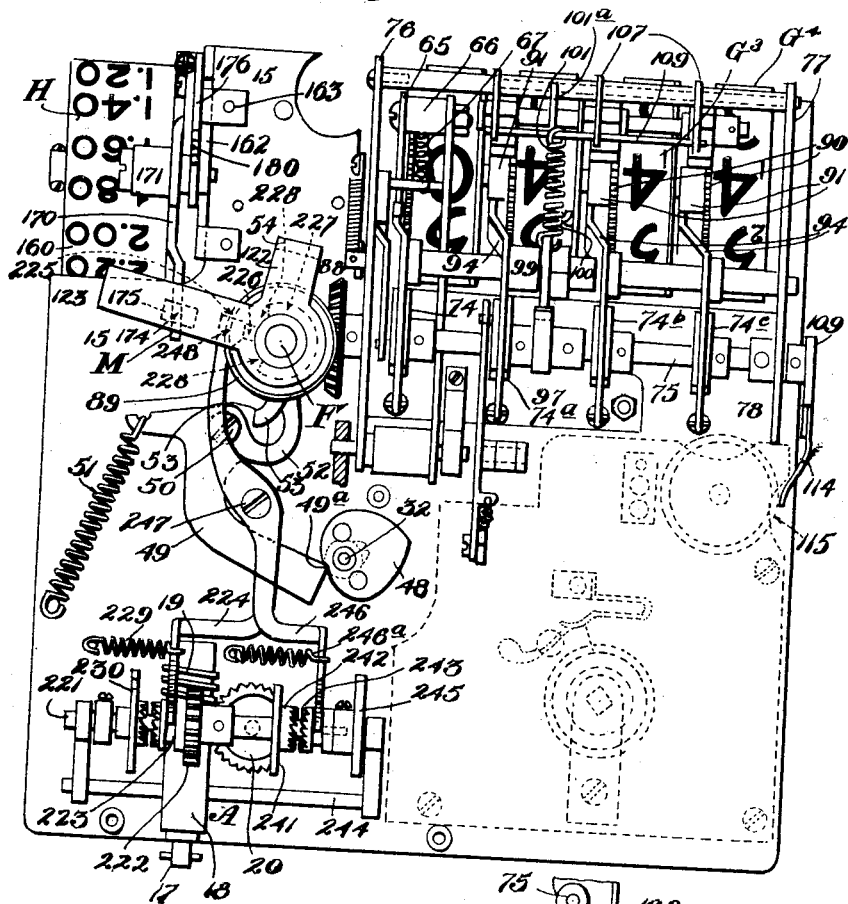
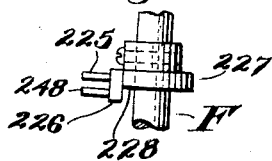

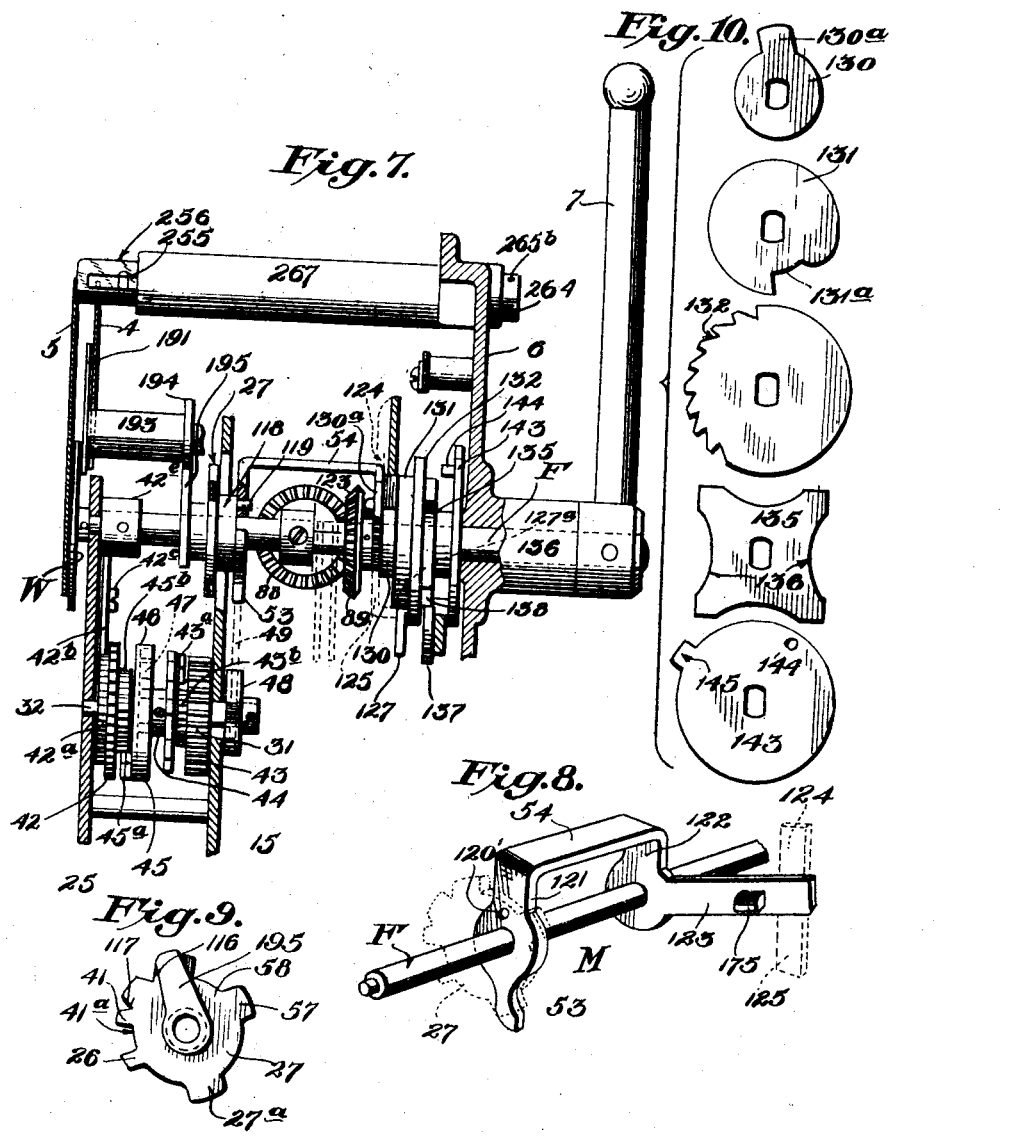

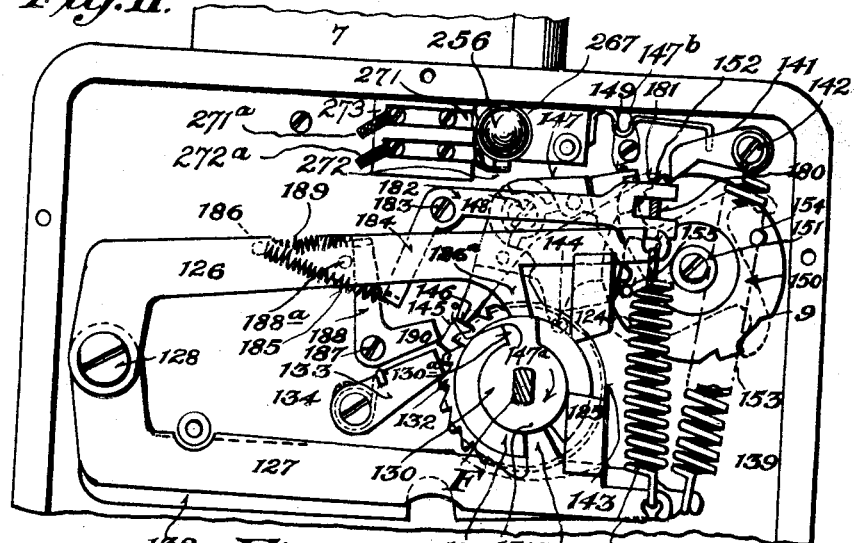
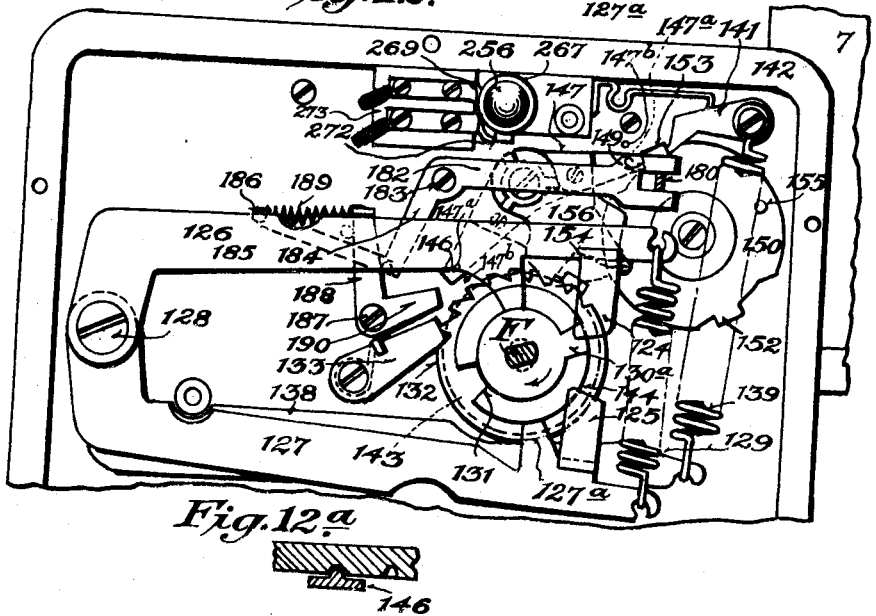

Aug. 30, 1932.    J. GLUCK ET AL    1,874,962
TAXIMETER CONSTRUCTION
Filed Aug. 28, 1930    9 Sheets-Sheet 8

Inventors
Julius Gluck
Rudolph R. Karich
By Hastings W. Baker
Attorney

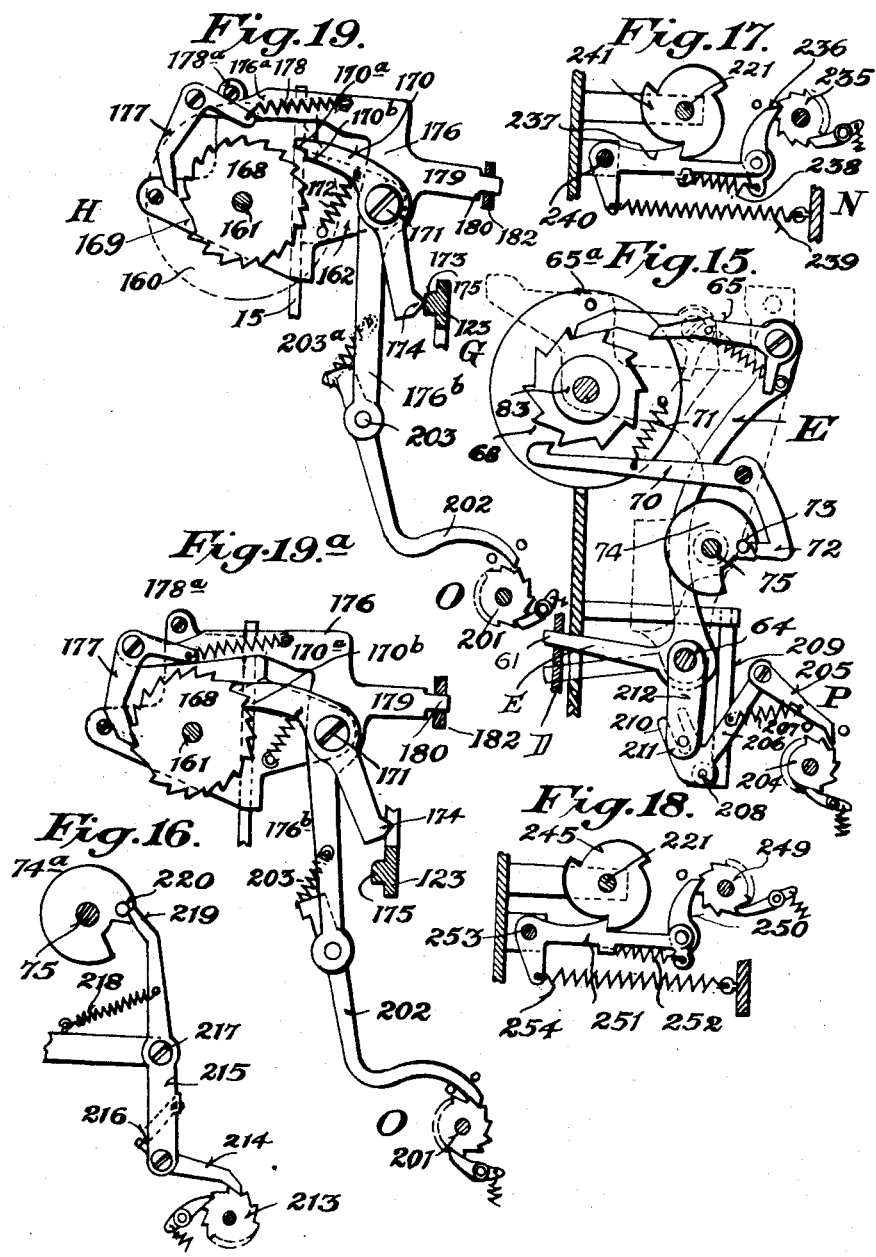

Patented Aug. 30, 1932

1,874,962

UNITED STATES PATENT OFFICE

JULIUS GLUCK AND RUDOLPH R. KARICH, OF NEW YORK, N. Y., ASSIGNORS TO OHMER FARE REGISTER COMPANY, OF DAYTON, OHIO

TAXIMETER CONSTRUCTION

Application filed August 28, 1930. Serial No. 478,332.

This invention relates to taximeters of the non-printing type, and more particularly to general improvements which simplify construction and contribute materially to a practical and durable meter.

To that end, the invention contemplates a construction wherein the various units are susceptible of standardization to increase production and lower manufacturing costs and also facilitate assembly, thereby not only lessening the initial manufacturing operations, but also readily permitting replacements and repairs when necessary.

One of the primary objects of the invention is to provide a quick, positive, and accurate means for setting the various instrumentalities of the meter in operation and likewise disconnecting them at the completion of the trip, while at the same time providing a device that is beyond the control of the driver, through the flag shaft, after the latter has moved through certain parts of its cycle. In construction heretofore used there has been a more or less prolonged interval between the fully engaged and fully disengaged positions of the meter parts, and vice versa, during which the meter could operate and permit the driver to defraud the passenger or cab owner. That is to say, there is a preliminary or preparatory movement of the time and distance clutches, as well as other parts which is undesirable because of the possibility of fraudulent manipulation.

Therefore, the present invention provides, as one of its distinctive features, means for connecting and disconnecting the various elements of the meter substantially instantaneously, the operation of said means manifesting itself in what may be termed a "snap" action or movement. Accordingly, it will be understood that it is one of the objects of the present invention to provide a construction where there is no delayed action or idle movement so far as concerns the flag control of the major instrumentalities and indicating devices of the meter, the same operating and engaging and disengaging instantly at the predetermined points of the flag cycle.

Another object of the invention is to provide a novel cash fare drum assembly which may be installed or removed from the machine as a unit with great facility, and which includes special rectifying means for insuring the proper engagement of the transfer pinions with the gears of the fare drums.

Also, another object of the invention is to provide a novel flag lock construction which will prevent the flag from performing a second cycle until the operator removes a check which automatically arrests the movement of the flag at the end of each cycle. While flag locks or flag check have been heretofore used, nevertheless the present invention contemplates a novel arrangement of the parts which are not only readily and easily made but simple and reliable in operation.

A further object of the invention is to provide novel detachably mounted extras unit comprising simple, reliable and accurately operating parts.

A still further object of the invention is to provide novel and practical means for illuminating the numerals on the fare drums. The present invention contemplates the positioning of the light, light wires and contacts entirely inside of the meter where they are not accessible to unauthorized persons. This construction also removes obstruction from the face of the meter, and furthermore, locates the lamp where it will more effectively flood the cash fare and extra fare drum positions with light. In that connection the invention also contemplates a novel lamp mounting which permits of the replacement of the lamp without removing the meter casing.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings in which:

Figure 1 is a perspective view of a meter embodyng the present improvements.

Figure 1ᵃ is a detail plan view of a portion of the top of the meter casing showing how the fare may be read from the top of the meter casing.

Figure 2 is a rear elevation of the outside meter embodying the present improvements.

Figure 3 is an enlarged front elevation of the meter with the front casing removed.

Figure 3ª is a detail view of the lug that operates in conjunction with the restraining collar.

Figure 4 is a side elevation of the improved meter construction, with the casing removed.

Figure 5 is a top plan view of the construction shown in Figs. 3 and 4.

Figure 5ª is a detail vertical cross sectional view taken on the line 5ª—5ª of Figure 5.

Figure 5ᵇ is a detail view of the carry-over lug side of the fare drums.

Figure 6 is a rear elevation of the meter as shown in Fig. 3 with the back plate removed.

Figure 6ª is a detail view of the cam for controlling the "paid miles" and "detector levers."

Figure 6ᵇ is a detail elevation of the clock-stop.

Figure 7 is an enlarged detail, more or less diagrammatic view illustrating the flag shaft and its connection together with its relation to the star wheel unit.

Figure 8 is a detail perspective view of the oscillating shifter member.

Figure 9 is a detail view of the oscillating controlling or master "snap" cam.

Figure 10 is a detail composite view illustrating the shape of the main cams on the flag shaft.

Figure 11 is an enlarged detail view of the back of the meter showing the flag shaft controlled means and the flag lock.

Figure 12 is a view similar to Fig. 11 further illustrating the instrumentalities shown therein.

Figure 12ª is a detail cross-sectional view of one of the arms of the locking dog showing how the same engages on a socket on the meter-back.

Figure 13:
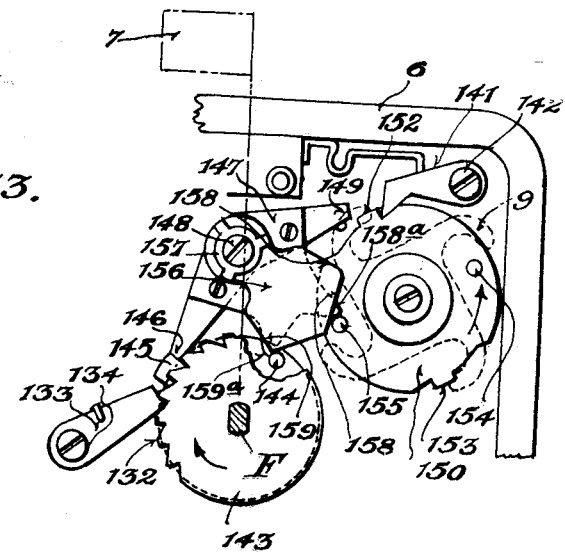

Figure 13 is an enlarged detail view of the flag lock with the parts in the "flag-up" position.

Figure 14:
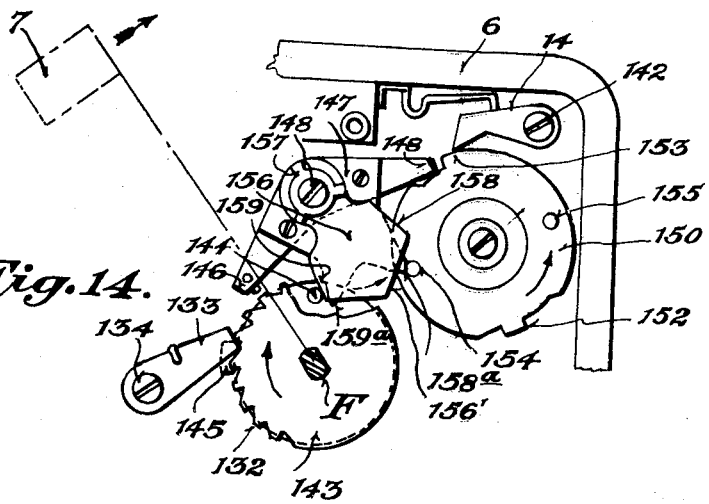

Figure 14 is an enlarged detail view similar to Fig. 13 showing the parts in position about to be operated by the flag, the guard apron being about to correct the position of the knob disk.

Figure 15 is a detail vertical sectional view showing the "drop levers" and the means for operating the "units" totalizer.

Figure 16 is a detail view illustrating the manner of mounting the "trip" totalizer.

Figure 17 is a detail view illustrating the manner of operating the "paid mileage" totalizer.

Figure 18 is a detail view similar to Fig. 17 showing the means for operating the "Total mileage" totalizer.

Figure 19 is a detail view taken on line 19—19 of Figure 5 showing a part of the extras mechanism, the same also illustrating the means for operating the extras totalizer, the parts being shown in the flag-up or "vacant" position.

Figure 19ª is a view similar to Fig. 19 showing another position of the parts of Fig. 19.

Figure 20 is a detail vertical cross-sectional view of the illuminating means.

Similar reference characters designate corresponding parts throughout the several figures of the drawings.

The present construction includes in its organization certain fundamental features, such for example, the driving means designated generally as A, the distance clutch B, and the star wheel unit C which may be operated either by the driving means A through the clutch B or by the clock C' through a clutch device designated generally as C², and which may be termed a time clutch.

The star wheel unit C in turn operates the fare drum actuating or "drop" lever D—E which is controlled by the flag shaft F through the medium of novel quick acting cam means carried thereby as will presently appear. That is to say, the actuating means for the cash fare drum, which includes the star wheel unit and the drop lever clutch C² both of which, in turn, are operated by flag controlled mechanism which moves the clutches by an instantaneous snap movement.

The lever E actuates the initial drum of the cash fare drum indicating unit designated generally as G which registers the fare on the face of the meter. Also, an extras fare indicating unit H is provided for the purpose of permitting the registration of extra charges by the driver such, for example, as the carrying of baggage or ringing up extra fare for different zone operations.

The flag-controlled mechanism which operates with an instantaneous snap movement is designated generally as M and includes a master controlling cam and shifter means therefor, the said cam controlling the operation of the distance clutch B, the time clutch C², and the indicating devices which include the cash and extra fare drums, shutter, indicating wheels, etc. This master cam for controlling the fundamental instrumentalities of the meter oscillates through a comparatively small arc, to perform the function of engaging and disengaging the parts, and may be seen best in Figs. 7, 8 and 9 of the drawings.

The back of the meter in which the flag shaft F is journaled carries therewith part of the extras operating means and the flag lock designated generally as N. Also, the back of the meter is provided with a suitable opening or window for receiving a frame carrying the various totalizer units for registering respectively as will be seen from Fig. 2, "Extras"—"Units"—"Trips"—"Detector miles"—"Paid miles"—and "Total miles."

The present meter construction is primarily intended to be standardized, as previously indicated, in such a way that the meter may be constructed for a "non-printing meter" such as shown and described in the present case, or a "printing meter" as shown and described in Patent 1,794,845.

Proceeding now with a general description of the construction it will be observed from Fig. 1 that the same includes a casing 1 having a base 2, the front of the casing being provided with an opening or window 3 for exposing a fare dial plate 4, the same having openings or windows 4a therein for viewing the fare registered on the fare drums and further having a window 4b for exposing the extras registered on the extras drum. The said dial may be covered by a shield plate 5 provided with an opening 5a for exposing the "Tariff" on which the meter is operated and the windows 5b and 5c through which the fare and extras drums may be seen when not obscured by the shutter. While the present meter is adapted and constructed for use as a single tariff meter, that is, a meter adapted to give only one rate after the initial charge has been consumed, nevertheless by suitable modification, namely, the changing of the gear ratio between the driving means A and the star wheel unit C the same can be made a double or triple tariff meter without difficulty. Single tariff meters are most generally used in the United States but for export purposes multiple tariff meters may be desirable and therefore the present construction is built with the end in view that by simply changing the gear ratio between the driving means and the star-wheel unit, meters of the different types may be obtained.

The casing 1 covers and conceals the entire meter mechanism and is secured to the back 6 of the meter which is preferably in the form of a plate in which the flag shaft F is journaled, the same carrying the conventional flag 7 as clearly shown in Fig. 2 of the drawings. Also the back of the meter 6 is provided with the extras operating knob 8, the flag lock manipulating knob 9 and the winding key 10 for winding up the clock.

As will be seen from Fig. 2 the back 6 of the meter is provided with a frame 11 removably fitted thereto, the same having a window 12 therein through which may be observed the dial 13 provided with openings for exposing the indicating wheels of the totalizer units heretofore identified.

One of the distinctive features of the invention resides in the construction of the various units on and about a main interior plate designated generally as 15. This plate supports all of the various instrumentalities except those heretofore mentioned as being carried by the back plate, and the same is itself connected to the back plate by suitable screws and spacing posts designated as 16. In this way the entire interior meter construction may be readily handled, and by merely slipping off the outer casing the entire mechanism is readily exposed to view and access.

The top of the casing may be provided with a window as shown in Fig. 1a to expose the small figures on the fare drums so that the driver of the cab can readily see the fare registered on the face of the meter. The feature of a top reading casing, that is a casing with a top window to expose a second series of small numerals on the fare drums, has been found to be in public use for many years and therefore no claim can be made thereto.

*The driving means*

The driving means A has particular reference to the vehicle driven instrumentalities to which motion is imparted by the vehicle wheel to the meter by means of the usual flexible cable.

As will be observed from Figure 6, a driving spindle 17 is adapted for connection with suitable reducing gear driven by the cable, the said spindle being journaled in the alcove 18 and carrying therewith a worm 19 meshing with the worm gear 20 mounted on the shaft 21 and journaled in the main supporting plate 15. On the front of the plate 15 the shaft 21 is provided with a gear 22 which in turn meshes with an idler gear 22a also located on the front of the plate 15. While the vehicle is in motion the gears 22 and 22a continuously operate, and in order to communicate motion to the star wheel unit C the clutch device B is utilized.

The clutch device B above referred to consists of a lever 23 pivotally supported as at 24 between a bracket plate 25 and the main plate 15. As will be seen from Fig. 3 one arm of the lever 23 is under the tension of the spring 23a while the opposite arm 24 is provided with a nose 23b which, when the flag is in the upright or "vacant" position, rests on the crown of the cam projection 26 of the master controlling cam 27. The lower part of the lever 23 is formed with a pendant arm 28 having mounted thereon the intermeshing idler gears 29 and 30, the former being continuously in mesh with the driving idler 22a. The gear 30 is adapted to engage and disengage with the driving gear 31 of the star wheel unit C as shown in Fig. 3. By inspection of Fig. 7 the position of the gear 31 in the star wheel unit will be readily observed.

As previously indicated when the flag is in the upright or "vacant" position the gear 30 is out of mesh with gear 31 but when the flag is moved in the direction of the arrow the flag shaft F is actuated and the nose 23^b of the lever 23 will drop off of the cam projection 26 and thus permit the lever 23 to swing under the influence of spring 23^a and throw the gear 30 into mesh with gear 31 thereby connecting the star wheel unit directly with the driving means A.

The lever 23 which forms a part of the distance clutch B and carries the idlers 29 and 30 is important in the particular that the said idlers prevent the movement of the star wheel unit due to the swinging movement of the lever 23. That is to say, the idler 30 of small diameter is adapted to engage the gear 31 by a substantially lineal movement radially of both gears rather than by a movement tangentially thereto, thereby avoiding the impelling forward of the gear on the star wheel unit when the gears engage. In that way no false movement is imparted to the star wheel unit by the distance clutch B.

Clock means for driving star wheel unit

The vehicle wheel-driven gear 31 of the star wheel unit is mounted on the main shaft 32 which is not only adapted to be driven by the vehicle actuated driving means A through the connections above described, but when the vehicle waits after being hired, the main shaft 32 may also be driven by the clock mechanism C'. The clock mechanism is of the usual construction and need not be described in detail here, it being sufficient to point out that the motion produced by the clock mechanism is transferred to the main shaft 32 of the star wheel unit through the medium of the clock driven shaft 33 which carries therewith the clock driven gear 34, or the clock driven ratchet 35.

For the purpose of connecting the star wheel unit with the clock driven shaft 33 and its gear 34 the time clutch C² is employed. This clutch includes a relatively large gear 36 mounted as at 37 upon the lever 38 which is pivoted at its lower end as at 38^a and tensioned by the spring 39. The upper end of the lever is formed at right angles and has a bearing nose 40 normally pressed back against the tension of the spring 39 by the cam projection 41 of the main controlling cam 27. When the flag is turned in the direction of the arrow, the flag shaft F is also turned and the nose 40 will drop into the notch 41^a so that the gear 36 will mesh with the gear 42 of the star wheel unit C.

As will presently appear, in the description of the star wheel unit C, the vehicle driven gear 31 thereof and the clock driven gear 42 are so mounted on the main shaft 32 that whichever gear is operating the fastest will drive the main shaft 32. Thus, if the vehicle stops temporarily in traffic jams or waits for the passenger to make a call, the clock will take up the work of advancing the main shaft while the vehicle is hired.

In connection with the clock driven ratchet 35 it is pointed out that the same is intended to operate the levers 35^a and 35^b which form a part of the mechanism for slowing up the action of the clock driven means on the star wheel unit if the cab waits on the initial fare period, as described and explained in Patent 1,650,121, issued November 22, 1927. Since the mechanism referred to in said patent is only used to meet special tariff requirements in some cities it is not necessary to use the same on all meters, and for the purposes of the present case it is only necessary to consider the operation of the star wheel unit by the clock through the connections 34, 36 and 42, the transfer idler 36 of the clock being controlled by the lever 38 as previously indicated.

The star wheel unit

The star wheel unit C includes the main shaft 32 having thereon the vehicle wheel actuated gear 31 and the clock actuated gear 42 as previously described. In order that either of the members 31 and 42 may drive the star wheel itself, it is of course necessary to provide ratchet means between the driven members and the star wheel.

That is to say, the members 31 and 42 are loosely mounted on the shaft 32, while the star wheel 43 is made fast with the shaft to rotate therewith, and as will be observed from Fig. 7 the said star wheel 43 has a hub portion 44 connecting the same with a restraining disk 45 having a flange or collar 46 provided with a notch 47. The disk 45 is provided with a spring-pressed pawl 45^a meshing with a ratchet 45^b carried by the clock driven gear 42. Also the star wheel 43 is provided on one side thereof with a spring-pressed pawl 43^a for engaging with the ratchet hub 43^b fast to the gear 31. The pawl and ratchet 43^a—43^b is related to the pawl and ratchet 45^a—45^b so that it will be clear that when the flag is in one of the hired positions either the clock or the vehicle wheel will actuate the main shaft 32.

In connection with the star wheel 43 it may be pointed out that although in the present instance said wheel is shown as having eight teeth, nevertheless, the number of teeth on said wheel may be readily varied according to the rate at which the meter is intended to operate. For instance, the wheel 43 may have four, or six teeth, according to the fare desired to be charged by the owner of the cab, and it will therefore be understood that the term "star wheel" applies to a general type of wheel and not to a wheel having any special number of teeth.

The main shaft 32 of the star wheel unit is journaled in the main plate 15 and the bracket plate 25 and one end thereof projects through the main plate 15 to receive the heart-shaped cam 48. This cam is fixed to the shaft 32 by means of a set screw or its equivalent so that the valley of the heart may be readily utilized as the point to which the unit always returns when it is reset. In that connection it may be pointed out that the notch 47 of the restraining collar 46 may be initially set with reference to the valley of the heart shaped cam 48 so that the desired amount of movement for the star wheel can be regulated to keep the fare drum operating instrumentalities out of action for the desired period to give the initial charge value in waiting time or distance traveled. In other words the collar 46 acts as a restraining means for the fare drum "drop lever"—D—E, until a part connected with the drop lever falls through the notch as will presently appear.

The heart-shaped cam 48 is held in its zero position by means of the lever 49 shown more fully in Fig. 6. This lever is pivoted to the main plate 15 of the meter as indicated at 50 and is tensioned by the spring 51 so when the flag is in the vertical or for hire position the keeper end 49ª of the lever will rest in the valley of the cam 48. At the same time, the spring 51 holds the curved arm 52 of the lever so that its end portion will engage with the finger 53 of the shifter member (Fig. 8) mounted on the flag shaft F and designated generally as 54. When the flag shaft is turned, the rounded edge of the finger 53 will engage the end of the curved part 52 of the lever 49 and pull the keeper end 49ª of the lever out of the path of movement of the heart-shaped cam 48. The keeper end 49ª will be held out of engagement with the periphery of the heart-shaped cam until the flag moves close to the end of its cycle, whereupon the lever 49 is released and the edge 49ª under the influence of the spring 51 will propel the heart-shaped cam until the edge 49ª rests in the valley thereof. Thus the snap device instantaneously accomplishes the resetting of the star wheel unit.

Another feature of the star wheel unit resides in the provision of means for preventing retrograde movement of the unit while the flag of the meter is in a tariff position and the lever 49 is out of contact with the cam 48.

As will be observed from Fig. 3 and also Fig. 7, the clock driven gear 42 has secured to one face thereof a ratchet 42ª adapted to be engaged by the end of the pawl 42ᵇ, the said pawl being pivoted to the bracket plate 25 as indicated at 42ᶜ and tensioned by the spring 42ᵈ. The upper end of the pawl 42ᵇ is adapted to engage with a cam 42ᵉ on the flag shaft F. This cam is provided with an offset cam projection 42ᶠ which in the vertical or "flag up" position holds the pawl 42ᵇ in the position shown in Fig. 3 so that the lower end thereof is out of engagement with the ratchet 42ª. However when the flag shaft F is moved it will be apparent that the cam 42ᵉ will also move and release the pawl to engage with the ratchet 42ª. In that way, the jarring of the cab while in motion will not affect the operation of the star wheel unit. When the star wheel unit is to be reset, the pawl 42ᵇ is of course withdrawn from the ratchet 42ª.

*Fare drum operating levers*

The primary actuator for the fare drums is the drop lever D—E, the latter section of the lever communicating the motion of lever D direct to the first fare drum of the unit G. Figs. 3 and 15 illustrate these levers.

Referring first to Fig. 3 it will be observed that the primary section D is pivoted to the main plate 15 as indicated at 55 and has the upwardly extending arm 56 adapted to engage with the projection 57 of the master controlling cam 27 when the flag is in the vertical or for hire position. When the cam 27 is shifted, however, the end of the lever 56 is pulled into the notch 58 due to the fact that the left hand end of the lever D is pulled downwardly by the spring D'.

The intermediate part of the lever D is provided with a star wheel engaging tooth 59 adapted to be engaged by the teeth of the star wheel 43, and is also provided with a slot 60 for receiving the arm 61 of the lever section E. This arm 61 projects through an opening 62 in the main plate 15, and as the lever D is oscillated under the influence of the moving teeth of the star wheel the arm 61 will be rocked and thus rock the lever section E.

Before proceeding with a description of the lever E of the drop lever, it may be pointed out that the intermediate part of the lever D carries therewith a pivoted spring tensioned lug 63. As soon as the main controlling cam 27 releases the arm 56 of the lever D the spring D' will pull the said lever downwardly, and the bottom of the lug 63 will rest on the periphery of the restraining collar 46. The lug 63 will remain on the periphery of the collar 46 until the initial charge registered on the face of the meter is used up, either by the travel of the vehicle or the operation of the clock. When this charge is used up the notch 47 will register with the end of the lug 63 and the latter will drop through the notch and thereby permit the star wheel engaging tooth 59 of the lever to obtain its full operating stroke. In connection with the lug 63 it will be observed that the same is pivoted as at 63ª and tensioned by the spring 63ᵇ as shown in Fig. 3ª, so that when the lever D is elevated during the resetting operation the lug will clear the flange or collar 46 without binding.

Referring further to the lever section E shown more clearly in Fig. 15 it will be observed that the same is pivotally supported on the shaft 64. The upper end of the lever E carries therewith a pawl 65 which is offset from the lever by the spacing sleeve 66 as shown in Fig. 6 and tensioned by the spring 67. As the section D of the drop lever moves downward and pulls the arm 61 with it, the part E is rocked forward so that the pawl 65 engages with the ratchet 68 on the first fare drum G' of the fare drum unit G. As the lever D moves upwardly the arm 61 is carried upwardly and the pawl 65 is withdrawn from the ratchet 68 preparatory to the next drop of the lever D, which lever because of its dropping action has been termed herein, together with the lever E, the "drop lever". The position of the part shown in Fig. 15 is the "flag up" or vertical position for the flag which means that the vehicle is for hire.

When the pawl 65 is operated the ratchet 68 the check pawl 70 is drawn into engagement with the ratchet by the spring 71. On the other hand when the parts are in position shown in Fig. 15 the pawl 70 is held out of contact with the ratchet due to the engagement of the end 72 thereof with the pin 73 carried by the resetting cam 74 on the main shaft 75.

As will be observed from Fig. 3, the pawl 65 is prevented from overrunning its stroke by the stop or abutment 65$^a$.

Fare drum unit

The fare drum unit G embodies several novel and distinctive features, one of which is the construction of the unit whereby it is possible to assemble the same on its own frame which may be attached and detached from the main plate 15 with facility thereby assisting the original assembling of the meter, and also in case of repairs, expediting the replacement with a new unit. In that connection it may be also noted that the unit carries the main cam shaft 75 for controlling the locking and resetting of the fare drums in such a way that it may be readily connected with the flag shaft F.

Another feature resides in the provision of rectifying means for bringing the teeth of the transfer pinions in proper relation to the gears on the fare drums each time the unit is reset.

Referring to Figs. 5, 5$^a$ and 6 it will be noted that the frame for carrying the fare drums consists of the end frame members 76 and 77 which are connected by the cross bar at their lower ends, the said cross bar being adapted to be attached to the main plate 15 of the meter by screws or equivalent fastenings 79. As also shown in Fig. 5$^a$ the plate 15 may have the front plate 15$^a$ of the clock attached thereto by means of the spacing sleeves 80 and the fastenings 80$^a$. With the arrangement described it will be apparent that the entire frame for the fare drums may be positioned and removed by manipulating the fastenings 79.

The upper front ends of the end frame members are connected by the bar 81 and the rear upper ends thereof are connected by the tie member 82. The forwardly extending arms of the end frames 76 and 77 carry the nonrotatable fare drum supporting shaft 83, and the rear intermediate body portions of the end plates are connected by a nonrotatable lever supporting shaft 84. Also, the lower part of the body portions of the said end plates have journaled therein the main cam shaft 75, previously referred to, the said cam shaft carrying therewith the cam 74 for the fare drum G', and also carrying therewith in spaced relation the cams 74$^a$, 74$^b$, and 74$^c$ for the fare drums G$^2$, G$^3$ and G$^4$. Looking at Fig. 6, the left hand end of the cam shaft 75 carries therewith a bevel gear 88 adapted to mesh with a bevel gear 89 mounted on the flag shaft F and rotating therewith so that the rotary movement of the flag shaft F will be communicated directly to the cam shaft 75.

As the transfer means from one drum to another and the resetting means therefor are the same for each drum, a description of one will suffice for the other, and for purposes of illustration these instrumentalities for controlling the fare drum G$^2$ have been selected.

Each of the fare drums is provided on one side with a gear 90, and to the face of the gear at its axis, it attached a heart-shaped resetting cam 91. The opposite side of each fare drum is provided with a plate member 92 carrying therewith one or more pairs of spaced transfer tooth receiving carry-over projections 93. In the case of the fare drum G' there are half as many pairs of carry-over projections 93 as there are numerals on the drum simply because the meter illustrated in the present case is a 5¢ meter, and in order to indicate the proper fare registration, it will be necessary to pick up the fare drum G$^2$ every other time that the drum G' moves. In other words, the fare drums G' and G$^2$ being respectively a cent and ten cent drum, and the meter operating on a 5¢ basic rate the fare will increase in increments of 5¢ each time viz: 15¢—20¢—25¢—30¢—35¢ and etc.

In the case of the dollars drum G$^3$ and the ten-dollar drum G$^4$, however, it will only be necessary for the drum G$^2$ to pick up the drum G$^3$ at the end of each revolution, and likewise the drum G$^3$ will pick up the drum G$^4$ at the end of each revolution. Therefore, the left hand sides of drums G$^2$, G$^3$ and G$^4$ (viewing Fig. 5) will only require one pair of carry-over or transfer projections 93.

In this construction, the heart shaped cams 91 operate in conjunction with the resetting levers 94, the drums being loosely mounted on the shaft 83. The resetting levers 94 are pivoted on the shaft 84 and the lower ends thereof are tensioned by springs 95 which normally hold the levers 94 in the valleys of the heart cams 91, when the flag is in the vertical or "flag up" position. To permit the resetting levers 94 to assume the position shown in Figs. 5ᵃ the projections 96 of the levers 94 are adapted to rest in the notches 96ᵃ of the cams 74ᵃ, 74ᵇ and 74ᶜ respectively. However, as soon as the flag shaft F is turned and the cam shaft 75 turns with it to lift the projections 96 out of the notches 96ᵃ onto the periphery of the cams 74ᵃ, 74ᵇ, and 74ᶜ respectively, the fare drums G' to G⁴ inclusive will be released for operation.

Slightly previous to the withdrawal of the resetting levers 94 from the valleys of the heart cams, the cam 97 on the shaft 75 moves its cam projection 98 away from the nose 99 of the transfer pinion carrying lever 100, thus permitting the transfer pinions to move into engagement with the gears 90 ahead of the release of the fare drums by levers 94. This transfer pinion lever 100 is also mounted on the shaft 84 and is tensioned by the spring 101 so that the transfer pinions 102 carried thereby are let down into engagement with the teeth of the gears 90, thereby holding all of the fare drums interlocked with the transfer pinions after the levers 94 have been withdrawn from the heart cams. It will thus be seen that the fare drums are inter-connected by the transfer pinions 102 near the beginning of the flag cycle. To prevent the transfer pinions 102 from moving too far inward toward the gears the lever 100 is provided with the stop arm 100ᵃ which is adapted to strike against the alcove of the rectifying means mounted on the bar 82 as clearly shown in Fig. 5ᵃ.

In connection with the transfer pinions 102 it will be observed that each is, in effect, a combination of two pinions one of which has half as many teeth as the other. Or, otherwise stated, each pinion is provided with alternate cut away or short teeth, the full teeth being designated 103 and the cut away teeth being designated as 104 as shown in Figs. 5 and 5ᵃ. The purpose of the transfer pinion is to carry over movement from one drum to another with a Geneva like movement and since four drums are used in the present construction three transfer pinions are used. The purpose of the cut away teeth 104 is to clear the edge of the plate 92, the plate being notched between the spaced carry-over projections 93 to receive a full tooth 103 to permit the pinion to move and effect the carry-over. In other words the edge of the plate 92 serves as a lock to engage two full teeth to prevent movement of the transfer pinions until the proper moment.

The said pinions 102 are mounted on a common shaft 105 carried in the upper end of the lever 100, and therefore the movement of this lever under the influence of the cam 97 controls all of the transfer pinions.

For the purpose of causing teeth of the pinions to properly mesh with the gears 90 and not jam against the edges of the plates 92 when the pinions are let down at the start of the trip, (when the flag is moved down) novel rectifying means is provided for holding the pinions properly positioned when and while they are withdrawn to permit resetting of the fare drums. This rectifying means can be readily seen from Figs. 5 and 5ᵃ and preferably consists of a sleeve 106 mounted on the bar 82, the said sleeve having thereon at spaced intervals, the flat plate-like pinion engaging fingers 107 whose front edges may be formed on a compound curve to produce the point 108. As shown in Figs. 5 and 5ᵃ the said pinion engaging fingers fit in the cut away portions of the teeth 104 of the pinions and thereby effectively hold the same in the proper relative position from which they are withdrawn from the teeth of the gears 90.

The pinion engaging fingers 107 may be connected at their lower ends by a tie rod and for convenience the spring 101 which tensions the pinion carrying lever 100 has one end connected to the tie rod as will be observed from Fig. 6.

From the foregoing it will be apparent that the fare drum unit includes simple and effective means for holding the drums in position when the flag is in the vertical or vacant position, the said means also readily effecting resetting, and when the combined holding and resetting means are thrown out of action, the fare drums are interlocked through the transfer pinions.

As will be observed from Fig. 6ᵇ the main cam shaft 75 has associated with the end thereof which projects thorugh the plate 77 a cam 109 for controlling the clock stopping means. This means comprises a lever 110 pivoted as at 111 to one of the parts of the meter frame and tensioned by spring 112 so that the end 113 thereof which bears against the periphery of the nose of the cam 109 is normally thrust upward. When the flag is up, that is in the "vacant" position, the cam 109 will assume the position shown in Figs. 6 and 6ᵇ but when the cam shaft 75 has moved a quarter turn the cam 109 will release the end 113 of the lever so that the depending spring member 114 carried by the lever will be raised out of contact with the balance wheel 115 of the clock mechanism. When the flag is in the "vacant" position, and the meter not registering the member 114 will always engage the balance wheel to prevent the operation of the clock, and on the other hand the cam 109 is so shaped that in all of the tariff positions of the flag the clock will be ready to operate when the vehicle stops or its speed becomes so low that its movement will not affect the movement of the star wheel unit.

Furthermore, it may be pointed out that the cam 109 is so shaped that if the flag is placed in the 270° position the clock will also stop and the tariff dial, which is visible through opening 5ª will show the legend "Not registering". Thus, if the cab breaks down, or a tire change must be made while the cab is hired, the driver may place the flag in the 270° position so that the clock will not drive the star wheel unit and charge the passenger for the time that he is not responsible for. When the flag is in the 270° position, however, the wheel driven instrumentalities are not disconnected so that the driver cannot defraud the meter by running with the flag in the "Not registering" position.

*Means for controlling indicating devices*

As stated at the outset of the specification, one of the distinctive features of the present invention is to provide means for effecting quick or substantially instantaneous actuation of the operating instrumentalities and indicating devices of the meter by a movement of the flag at predetermined points in its cycle.

Accordingly, to attain that object, it is proposed to provide a flag controlled mechanism operatively connecting with the actuating means for the indicating devices, said mechanism including parts which operate independently of the flag with a snap movement to throw the said actuating means in and out of action.

By reference to Figs. 7, 8, 9 and 10, of the drawings the relative position and relation of the parts constituting the flag controlled mechanism may be observed. This mechanism includes parts, such for example as the master cam 27 having combined therewith the shutter operating cam 195 and the oscillating shifter member 54 together with suitable means for throwing or operating the said shifter member, the said means being actuated by but moving independently of the flag shaft F.

At the point where the snap movement occurs to throw the meter in action the flag is locked against backward movement due to pawl 133 engaging the teeth of the flag ratchet cam—132, and vice versa. The movement of the flag back and forth between the points in the flag cycle where the parts "snap in" and "snap out" has no effect on the operation of the meter, except to stop the clock at the 270° or "Not registering" position.

The oscillating master controlling cam 27 has the projection 26 for working the clutch lever B as previously indicated, and also has the cam projection 41 and valley 41ª for controlling the time clutch lever 38 and likewise has the projection 57 and valley 58 for controlling the main drop lever D which is actuated by the star wheel.

In addition to having the projections referred to for performing their intended functions the said cam 27 is also provided with a projection 27ª which may engage with the stop pin 27ᵇ on the plate 15 to limit the movement of the cam in one direction.

To further assist in accurately shifting the oscillating cam 27 the same is provided with the keeper notches 116 and 117 adapted to receive the nose 117ª of the pawl 117ᵇ which is tensioned by the spring 120.

The cam 27 is provided with a hub portion 118 and is loosely mounted on the flag shaft, the said hub portion 118 carrying a rearwardly projecting pin 119, Fig. 7, for engaging in an opening 120' in the collar 121 of the shifter member 54. In this way the cam 27 may be interlocked with the oscillating shifter member 54 in a simple and expeditious manner so that the cam and shifter member may freely turn on the flag shaft. The rear arm of the shifter member 54 is designated 122 and carries therewith a laterally offset throwing arm 123, the outer end of which is arranged between and struck by the fingers 124 and 125 respectively of the upper and lower blade members 126 and 127 which are of angular formation and pivotally supported on the inside face of the back of the meter as indicated at 128 in Fig. 11. The front ends of the blades 126 and 127 are resiliently connected by the relatively stout spring 129 so that the members 124 and 125 resiliently clamp the outer end of the throwing arm 123 after the same has been shifted. The upper blade 126 is provided with the tooth 127ª adapted respectively to engage with the cam 130 and the cam 131 on the flag shaft F.

*Flag shaft cam*

The cams 130 and 131 are a part of the flag shaft controlled unit and are fast on the cam shaft F. The cam 130 is provided with a projecting tooth 130ª for engaging with the tooth 126ª of the upper blade while the other cam 131 is provided with a notch 131ª for receiving the tooth 127ª of the lower blade 127. The projection 130ª and the notch 131ª are diametrically opposite so that the effect of the movement of the cams 130 and 131 is to shift the spring tensioned forward ends of the blades to compel the fingers 124 and 125 to snap the throwing arm 123 first to one side and then the other to impart an oscillating snap motion to the main oscillating controlling cam 27.

Assuming the parts to be in the "flag up" position shown in Fig. 11 when the flag F is turned in the direction of the arrow the cam 131 will move the tooth 127ª out of the notch 131ª the initial movement of the blade 27 increasing the tension of spring 129 somewhat so that by the time the tooth 126ª drops off of the tooth or projection 130ª of the cam 130, the upper blade 126 will move downward with a quick sharp thrust so that its finger 124 will move the throwing lever 123. In the meantime, of course, the finger 125 of the lower blade is being moved out of obstructing relation to the arm 123 due to the fact that the tooth 127ª is lifted out on to the periphery of the cam 131.

As the flag moves back to the flag up or vacant position at the end of the trip at a point near the end of its cycle the reverse of the action just described takes place so as to snap the lower blade 127 upwardly, the upper blade 126 being lifted upwardly by the cam projection 130ª, thus restoring the parts from the position shown in Fig. 12 to the position shown in Fig. 11.

By referring to Fig. 7 the cams adjacent to the blade controlling cams will be observed. The cam adjoining the cam 131 for controlling the lower lever is called the flag ratchet cam and is designated 132. This cam is also fast to the flag shaft and has a plain periphery for a portion of its circumference, the remainder being formed with ratchet teeth which are made blunt or squared at the ends to more effectively engage with a spring pressed pawl 133 pivotally carried by the back of the meter at 134. When the flag is in the vertical position it will be apparent that it will be impossible to turn the same backward, or in the wrong direction due to the engagement of the pawl 133 with the teeth of the cam 132. These teeth are so arranged that the pawl 135 will come into the ratchet shortly after the flag passes the 270° point in its cycle to begin the resetting functions of the meter and the pawl remains in engagement with the ratchet all the way back to the zero or vertical position of the flag, as well as when the flag moves downward to substantially its 90° initial position. In other words, the purpose of the cam 132 is to prevent the backward rotation of the flag shaft from a point substantially at the 90° or first tariff position and also from a point between the 270° and 360° position. The plain periphery of the cam permits of the movement of the flag shaft back and forth between the 90° and 270° position so that if the meter is designed to work on more than one tariff the flag can be set to the tariff desired.

The cam adjoining the flag ratchet cam is the flag check cam 135. This cam has four equi-distantly spaced notches 136 arranged 90° apart and adapted to receive the roller 137 on the end of lever 138 which is pivoted on the same axis 128 as the blades 126 and 127. The free end of the lever 138 is engaged by a relatively stout spring 139 whose upper end engages with the stud 142 on which a check pawl 141 is pivoted and operates as a part of the flag lock means about to be described. The lever 138 serves to hold the flag in either the 90°, 180°, 270°, or 360° position of its cycle due to the fact that the roller 137 carried thereby engages in one of the four notches 136, and temporarily holds the flag in the proper position until it is desired to be manually shifted to another position.

*The flag lock*

The cam disk 143 which is fast on the flag shaft F is spaced from the flag check cam 135 by a suitable hub in order to provide working space for the pin 144 carried thereby as shown in Fig. 7. Also as will be observed from Figs. 13 and 14 the flag locking cam 143 is provided with the offset projection 145 adapted to engage with the end 146 of a flag locking dog 147. The body of this dog is pivoted to the back of the meter as indicated at 148 and has two arms which extend substantially in opposite directions, one of said arms providing the locking shoulder 146 and the other providing the locking shoulder 149. To assist in holding the dog 147 in either of its set positions the rear faces of the arms are provided with keeper pins 147ª (Fig. 12ª) adapted to seat in keeper sockets 147ᵇ formed in the back of the meter.

The locking dog 147 is adapted to cooperate with an operator's controlled knob disk 150 the same being rotatably mounted in the back of the meter as indicated at 151 and adapted to be manipulated by the operator's knob 9 (see Figs. 2 and 9). This disk 150 is provided with the peripheral cam abutments 152 and 153 arranged diametrically opposite on the disk, and is also provided with the diametrically opposite studs 154 and 155 on the face of the disk.

Pivoted on the same axis 148 with the dog 147 is a frictionally mounted guard and rectifying apron 156 frictionally pressed against the body of the flag locking dog by the friction washer 157. The guard apron 156 is substantially wedge shaped at the end opposite its pivot providing edges 158 and 159 which substantially overlie the abutment corners 158ª and 159ª of the body of the flag locking dog 147.

With the flag in the vertical or vacant position the parts will assume the relative positions shown in Figs. 11 and 13, and from which it will be understood that the flag and the flag shaft F have just completed a cycle. In this position of the parts, the flag locking disk 143 will be prevented from moving further due to the fact that the projection 145 is engaged with the shoulder 146 of the pivoted flag locking dog.

In order to permit the flag to move in a new cycle, it will be necessary to turn the operator's knob 9 and thus in turn rotate the disk 150, the latter being free to rotate in the direction of the arrows on the figures above referred to. As the operator manipulates the knob 9, the cam abutment 152 of the disk 150 passes freely beneath the end 149 of the locking dog and the pin 154 moves around until it strikes the edge 158 of the guard apron 156. On meeting the edge 158, the pin 154 will shift the same and continue until it strikes the corner 158ᵃ of the body of the dog 147 whereupon the said pin will cause the body of the dog to rock on its pivot 148 and lift the shoulder 146 out of the path of the projection 145 on the flag locking disk 143. Simultaneously with the lifting of the end 146 of the dog, the end 149 thereof is lowered into contact with the periphery of the knob disk 150 so that the continued rotation of the disk will cause shoulder 149 to engage with the projection 153 on the knob disk, thereby preventing further rotation of the knob 9. The flag shaft F will then be released for movement through its cycle to the desired tariff positions and the knob 9 will be locked against further movement due to the engagement of 149 with 153. The knob 9 and the knob disk 150 will remain locked until the flag and flag shaft complete their cycle, or until the flag is within a few degrees of its 360° position.

As the flag approaches its 360° position, the pin 144 thereon will strike the edge 159 of the frictionally held guard apron 156 and move the same slightly so that in event that the disk 150 having thereon the pin 154 (which has taken the place of the pin 155) is not in the right position (see Fig. 14) to permit the corner 158ᵃ to clear the pin, the edge 158' will properly place the disk and the pin 154 so there will be no binding or jamming of the body of the flag lock with the disk 150, and pawl 141 will engage shoulder 153. The guard apron rectifies the improper position of the disk shown in Fig. 14.

After the pin 144 has moved the guard apron 156 to insure the proper positioning of the disk 150 it will then move on and strike the corner 159ᵃ of the body of the dog 147 which will have the effect of lifting the end 149 of the flag locking dog out of engagement with the projection 153 and simultaneously throwing the end 146 of the locking dog down into obstructing relation to the projection 145 of the flag locking disk 143. Thus, the flag and flag shaft become locked and the knob 9 becomes free immediately upon the completion of the cycle of the flag.

It will be observed that the guard apron 156 is one of the distinctive features of the invention since it provides for accurate operation of the knob controlled disk and the flag locking disk and also prevents one disk working against the other in event that the knob disk is not positioned exactly in the proper position.

*The extras mechanism*

The means for registering the extras on the face of the meter has been designated generally as H and includes in its organization an extras faredrum designated as 160 (see Fig. 4) the same being mounted upon a shaft 161 carried in the bracket 162 detachably secured on the upper part of the main meter plate 15 by fastenings 163 (Fig. 5). The bracket 162 is provided with a stop pin 164 which is adapted to be engaged by a pin abutment 165 carried by the side of the drums 160, and normally held in engagement with the rigid abutment 164 by means of a spring 166 coiled about the hub portion of the drum which is mounted on the shaft 161. One end of the spring is fastened to the side plate of the drum and the other plate of the drum is fastened to a securing collar 167 fitted to the end of the shaft 161 as shown in Fig. 4.

The side plate of the drum 160 carries therewith a ratchet 168 which has two of its teeth cut away as at 169 as shown in Fig. 19 so that when the drum reaches the end of its cycle of rotation the further operation of its actuating pawl will not be possible, due to the fact that such movement will merely be idle.

The ratchet 168 of the extras drum is provided with a check pawl 170 which is pivotally supported as at 171 to the bracket 162 and is under the tension of the spring 172 so that its arm 173 is pulled in a counter-clockwise direction. The nose 174 of the arm 173 is adapted to be engaged by the offset lug 175 carried by the throwing arm 123 of the oscillating shifter member 54 when the flag is in the upright or vertical position. In other words when the flag is in vacant position the keeper pawl 170 is held out of engagement with the ratchet 168 but as soon as the flag is turned to a tariff position due to the movement of the oscillating shifter member the pawl 170 is released and pulled into engagement with the ratchet by the spring 173. The end of the pawl is provided with two teeth as indicated at 170ᵃ and 170ᵇ so that when the drum reaches the end of its cycle and the keeper pawl registers with the place where one of the teeth is cut away, as indicated at 169, the ratchet 168 cannot be further actuated.

Referring now to the means for actuating the extras drum 160 it will be observed that the same consists of the angular rocking lever 176 having attached to its forward end the ratchet engaging pawl 177 which is tensioned by the spring 178. The arm 176ᵃ of the rocking lever 176 which carries the pawl 177 is limited in its upward movement by the stop pin 178ᵃ mounted on the bracket 162. The said rocking lever 176 is pivoted on the same axis 171 as the check or keeper pawl 170 and has the rearwardly extending arm 179 which terminates in a narrowed or constricted portion 180 adapted to enter the slot of the forked end 181 of a main actuating lever 182. This lever 182 is pivotally mounted on the back of the meter as shown in Fig. 11 at 183 and has a downwardly inclined arm 184 provided with a laterally offset foot portion which forms an anchorage for one end of the spring 185, the other end of the spring 185 being anchored to spring 186 on the back of the meter.

The effect of the spring 185 is to pull the arm 184 clockwise so as to normally thrust the forked end 181 downwardly and thus also press the constricted end 180 of the lever 176 downwardly, thereby keeping the arm 176ª normally elevated and in contact with the stop 178.

For the purpose of manually actuating the lever 182 the extras operating member 8 on the outside rear face of the meter (Figure 2) is mounted on a shaft 187 which carries therewith a substantially L-shaped lever 188 the upwardly extending arm of which is pulled counter-clockwise by the spring 189 against the stop abutment 188ª on the back of the meter (see Fig. 11). The other arm, 190, of the lever 188 is adapted to be engaged and released by the offset projection 145 of the flag lock disk 143 so that when the flag is in the upright or vertical position it will be impossible to manipulate the extras operating member 8 on the back of the meter.

That is to say, the flag lock disk 143 serves as a lock against the manipulation of the extras drum while the flag is in the upright or "For hire" position, thereby preventing the driver from fraudulently registering extras on a passenger before the cab is hired.

As soon as the flag lock knob 9 has been manipulated to release the flag locking disk 143, and the flag and flag shaft F have been moved so that the projection 145 is out of the path of the arm 190, the extras operating knob 8 on the outside of the meter can be manipulated.

*Shutter for concealing fare drums*

Another distinctive feature of the invention resides in the provision of a jumping shutter which constitutes a part of the indicating devices of the meter and moves through an arc of a circle rather than long sliding guides in the way shutters have heretofore been operated. The quick movement of the shutter is obtained by effecting its operation by a part of the snap device.

This shutter, designated generally as 191 is shown in Figs. 3 and 7 and is loosely pivoted on a post 192 projecting forwardly from the upper end of the main plate 15. The shutter is carried upon the forward end of a sleeve 193 whose rear end is provided with a curved downwardly projecting cam 194 (see Fig. 3). This cam 194 is tensioned by spring 194ª which is engaged by a cam 195 loose on the flag shaft F but connected to master cam 27 and operating therewith so that the shutter is under the direct control of the mechanism that operates with a snap action. When the said flag shaft and the flag 7 are in the upright or vertical position the shutter will be supported in the horizontal position shown in Fig. 3 and will cover the numerals on the fare registering drums G' to G⁴ inclusive and the extras drum 160, also exhibiting the legend "Not registering".

In connection with the shutter 191 it may be pointed out that the same is mounted between the dial plate 4 having the openings for exposing the fare drums, and the shield plate 5 as indicated in Fig. 7. This spacing of the plate 4 and shield 5 provides a light diffusing chamber for illuminating the face of the fare drums when the meter is in use and the flag in one of the tariff positions. This will be more fully explained in connection with the light unit hereinafter more fully referred to.

With further reference to the shutter it may be pointed out that when the flag is turned to one of the tariff positions it moves to the dotted position in Fig. 1 and in order to prevent the shutter from being partly exposed when it uncovers the numerals on the fare drums, the same may be cut away as indicated at 191ª, and also the short arm thereof is provided with a flaring shield portion 191ᵇ to completely cover the extras window.

From the foregoing it will be apparent that the present construction provides an oscillating shutter instead of a sliding shutter which operates instantly to expose and conceal the fare drums when the flag shaft is operated.

*Totalizers*

The present meter is concerned with non-printing meter construction features wherein visible totalizer units are mounted at the back of the meter to give a visual record of the performance of the cab.

The feature of providing visible totalizer units is one of the oldest in the taximeter art and the means employed herein for operating the indicating wheels of the "Extras", "Units", "Trips", "Paid mileage", "Total mileage", etc., are all variations of units for performing a similar function that have been in use since practically the beginning of the taximeter art, and therefore they are not a part of the claimed novelty of the present invention. The designation "indicating wheels" herein broadly refers to number wheels, meaning wheels, disks or drums having either reading numbers or numerals or embossed type printing numbers or numerals, such, for example as those disclosed in Patent 1,794,845.

These units are all carried upon a frame mounted in an opening in the back plate of the meter, the said frame being designated generally as 200, the same being covered by the dial plate 13 shown in Fig. 2. That is to say, these units consisting of number wheels, disks, or counters, whatever they may be termed, are all mounted in the frame 200 and connected by suitable operating instrumentalities with the various parts of the meter construction, and are visible through the opening in the dial plate 13.

These units respectively indicate "extras", "units", "trips", "detector mileage", "paid mileage", and "total mileage" and are designated respectively by the reference characters O, P, Q, R, S, and T.

Referring first to the extras unit O for indicating the number of time the extras drum is advanced to register the next highest increment of extra fare on the face of the meter, it will be observed that the same purposely includes three wheels of the conventional carry-over type and wherein the wheel of lowest value is provided with a ratchet 201 adapted to be engaged by the pawl 202 pivotally carried as at 203 on the depending arm 176$^b$ of the extras operating lever 176. The said pawl 202 is tensioned by the spring 203$^a$ so that as the end of the arm 176$^b$ swings back and forth through its arc, the same will operate the ratchet at 201 and thus operate the extras totalizer.

If the increment of extra charges is 20¢, the number of extras earned by the particular meter shown in Fig. 2 will be 20¢ times "242" so that the desired record of the extras earning of the meter may always be obtained.

The "Units" set of number wheels designated generally as P includes four register wheels and the wheel of lowest value is provided with a ratchet 204 adapted to be operated by a pawl 205 carried by an angular lever 206, and to which it is tensioned by the spring 207. The lever 206 is pivotally supported as at 208 to the bracket 209 and is provided with a forked end portion 210 adapted to receive the pin 211 of the lever arm 212 which is fast on the shaft 64 which carries the lever E.

As the shaft 64 rocks to operate the ratchet 68 of the fare drum G' it will be apparent that the lever 206 is rocked, thereby actuating the ratchet 204 of the unit P. Thus, each time the fare drum G' is operated the same will be registered on the set of wheels P and it will be possible to tell how many fare "units" have been collected by the driver.

The "Trips" register unit consists of three number wheels, the one of lowest value having the ratchet wheel 213 associated therewith. This ratchet is adapted to be operated by the pawl 214 carried by the lever 215 and tensioned by spring 216. The lever 215 is pivoted at 217 and is pulled in a counterclockwise direction by the spring 218. The end 219 of lever 217 is adapted to engage with a stud 220 carried by the side of the cam 74$^a$ which is mounted on the main cam shaft 75. As the cam shaft 75 turns with the flag shaft it will be apparent that each revolution of the flag shaft and the cam shaft will be recorded on the number wheels of the unit Q by the engagement and disengagement of the stud 220 with the end 219 of the lever 215.

The "Detector mileage unit", designated generally as R consists of two register wheels adapted to register the miles or parts of miles that the cab is operated with the flag in an improper position, that position being at a point near the beginning of the cycle of the flag or at a point near the end of its cycle. Sometimes a driver may seek to defraud the meter by thinking that he can place the flag a few degrees forward in the beginning of its cycle believing that the parts will not be fully engaged and therefore not operating and registering. It is the purpose of this set of wheels to detect such an occurrence, or a similar occurrence with the flag near the end of its cycle at which time it is generally understood that the interengaging parts are being reset.

The detector mileage unit R as well as the paid mileage and total mileage units S and T are all operated from an auxiliary cam shaft 221 shown in Figs. 4 and 6 of the drawings, the same having thereon a gear 222 which is driven by the worm 19 of the driving means A. The gear 222 is fast on the shaft 221 and has slidably keyed therewith a clutch collar 223 engaged by the yoke end of an angular lever 224 whose upper end 225 rests upon the cam projection 226 of the cam 227 when the flag is in the vertical or for hire position. In connection with the cam 227 it will be observed that the same is provided with notches 228 on each side of the projection 226, the said notches corresponding in length to the arc of movement of the flag during which it is desired to register whether or not the flag is positioned improperly. It will therefore be seen that when the nose 225 of the lever 224 rests in either of the notches 228 the lever 224 will be pulled to the left (Fig. 6) under the influence of spring 229, thereby moving the collar 223 with its clutch face into engagement with the mating clutch face on the cam 230. The cam 230 is loosely mounted on the shaft 221 so that it is only rotated when the flag is in an improper position due to the condition above described.

The cam 230 is adapted to operate a lever 231 pivotally supported at 232 and carrying at its forward end a pawl 233 the same adapted to engage with a ratchet 234 carried by the number wheel of lowest value of the detector mileage unit R.

It will thus be apparent that the cam 227 on the flag shaft F controls the operation of the lever 224 which in turn controls the shiftable clutch member 223 to connect the wheel driven shaft 221 with the number wheels of the unit R.

The "Paid mileage" register unit S consists of four number wheels, the one of lowest value having thereon a ratchet 235 adapted to be engaged by a pawl 236 carried by lever 237 and tensioned by the spring 238. The lever 237 is also tensioned by the spring 239 whereby it will be swung on its pivot 240 upwardly into engagement with the cam wheel 241 mounted on the auxiliary cam shaft 221. The cam wheel 241 is loosely mounted on the shaft 221 and is provided with a clutch member 242 adapted to be engaged by the clutch face of a shiftable clutch member 243 which is slidably keyed to the hub 244 of the cam wheel 245 mounted fast on the shaft 221 and rotating therewith.

The shiftable clutch member 243 is engaged by the yoke end of a clutch shifting lever 246 pivoted on the same axis 247 as the lever 224. The upper end or nose 248 of the lever 246 is also adapted to be controlled by the cam projection 226 of the cam 227. In connection with the cam projection 226, however, it will be observed that the same projects laterally beyond the normal periphery of the cam 227 so that the nose 248 of the lever 246 will only be engaged when the flag is in the "flag up" or "vertical" position (see Fig. 6ª). As soon as the flag is moved from its vertical or "For hire" position the lever 246 will be drawn by the spring 246ª to cause the clutch members 242 and 243 to engage and thus operate the cam 241 to show in miles and fractions of a mile how far the cab runs with the flag in one of the tariff positions.

The "Total mileage" unit T preferably includes four number wheels, the one of lowest value having thereon a ratchet 249 adapted to be engaged by the pawl 250 pivotally carried by lever 251 and tensioned by spring 252. The lever 251 is pivoted as at 253 and the spring 254 moves the same upwardly into contact with the cam wheel 245, which as previously described, is keyed to, otherwise made fast to, the auxiliary cam shaft 221. This cam 245 rotates continuously while the vehicle is being driven, and therefore operates the lever 251 continuously so that all traveling movement of the cab is recorded on the total mileage number wheels of the unit T.

With the foregoing types of number wheels, all of which are visible from the back of the meter it will be possible always to take off readings of the state of the various units of the meter for record purposes.

*Fare drum illuminating means*

As previously set forth in connection with the description of the shutter 191, the same is located in the chamber formed by the spaced dial 4 and shield 5. This chamber is flooded with light from the filament 255 of a lamp 256, the filament being disposed so as to illuminate the chamber or space between the members 4 and 5 to facilitate the reading of the fare registering drums as well as the extra drum.

The said lamp 256 has its plug portion screwed into the threaded shell portion 257 of an inner metal socket tube 258, the end of the tube opposite the threaded part 257 receiving an insulation post 259, the same being provided with a groove 260 for receiving a conductor 261 connecting the center plug contact 262 with the metallic contact ring 263, fitted on the post but spaced from the tube. The insulation post 259 is carried by a cap 264 having an exteriorly screw threaded portion 264ª and a flange 265, the threaded portion 264ª adapted to enter the interiorly threaded portion 266 of an elongated outer tube 267 which is exteriorly threaded as at 268 thereby to fit in the back wall or plate 6 of the meter.

The outer metallic tube 267 is therefore carried and supported by a part of the meter casing and houses the insulated post 259 carried by the cap 264 having the flange 265 and also providing the necessary contacts for the lamp terminals. Said tube 267 is also provided with elongated longitudinal slots 269 and 270 in opposite sides thereof, and, as will be apparent, is intended to telescopically receive, through the back wall of the meter, the lamp carrying member including the post 259 and the parts just referred to. In connection with the lamp 256 it will be observed that the globe thereof is small enough to clear the interior diameter of the outer tube 267 and its insulation 267ª so that by merely unscrewing the lamp carrying member from the outer tube the entire central member can be withdrawn from the back of the meter to replace a lamp without removing the casing of the meter. The back plate of the meter carries the permanent contact members 271 and 272 mounted on insulation block 273 and which respectively pass through the slots 269 and 270 and bear against the metallic contact ring 263 on the insulated post 259 and also against the inner metallic tube, 258. It may be pointed out that the contact members 271 and 272 are spaced apart sufficiently to avoid short circuiting when the central lamp carrying member is inserted and withdrawn from the tube 267. The contacts 271 and 272 have connected therewith the line wires 271ª and 272ª which are connected with a battery or other sources of electrical energy.

The present construction has the advantage of providing for completely concealing the wiring within the meter casing, and enables the lamp to be removed without disturbing any of the meter parts. In that connection, the arrangement described also enables the contacts to be made inside of the meter by merely screwing in the lamp carrying plug or post.

From the foregoing it will be apparent that the present construction not only provides means for effectively illuminating the fare dials in a manner far more efficiently than heretofore, but also provides a construction which cannot be tampered with by an unauthorized person. The body of the cap 264 may be provided with holes 265 to receive a wire which may be passed through the cap and thence through an opening in a post 275 adjacent the cap, the said wire receiving a lead seal. Should this seal be broken it will of course be apparent that the lamp has been tampered with and the driver can be held to account.

Meter framework

Another novel feature of the invention, from a manufacturing and assembling standpoint resides in the way that the meter framework is built so that all of the main meter instrumentalities can be supported by the main mechanism plate 15, the said plate being connected to the back 6 of the meter by the spacing posts 16. In that way, after all of the parts are fitted to the main plate 15, the back plate 6 carrying the flag and the number wheel units etc., can be fitted into place to complete the assembly of the meter.

The main plate 15 carries the driving means A which includes the gear 22 whose shaft 21 is journaled in the main plate in a position to be engaged by the gears of the distance clutch device B for transferring the movement of the vehicle to the star wheel unit C. The main shaft 32 of the star wheel unit is journaled in the main plate 15 and a bracket plate 25 which is secured to the main plate by the posts 25$^a$.

The extras unit H is detachably fitted to the main plate 15 by the bracket 162 so that it may be readily mounted and dismounted as a unit. Likewise, the main fare drum or cash unit G may be removably fitted to the rear face of the plate as described in connection with that unit.

Below the fare drum unit G, the frame of the clock may be secured as indicated in Fig. 5$^a$, wherein the front plate 15$^a$ of the clock frame is attached thereto by means of the spacing sleeves 80 and the fastenings 80$^a$.

The arrangement described permits of assembling the various units on the plate 15 by bench work, and the flag shaft, flag lock, extras operating means and the blade elements of the instantaneous cam actuator may all be assembled on the back plate, together with the number wheel units so that the bringing together of the back plate with the parts assembled on the main plate will position the various instrumentalities in operative relation.

The casing 1 may be fitted over the meter mechanism and secured to the back thereby completely housing the meter mechanism.

General operation

When the flag 7 of the meter is in the upright or "Vacant" position shown in dotted lines in Fig. 1 and in full lines in Fig. 2, the shutter 191 will conceal the numeral on the fare drums G and G$^4$ inclusive and the extras drum 160, and all of the various parts of the meter will be disengaged and inoperative with the exception of the total mileage unit T, which, of course, registers the entire movement of the vehicle to which the meter is attached.

Of course, if the flag is in an improper position, that is, a few degrees at one side of its starting position or near the end of its cycle the detector mileage unit R will record the number of miles or fractions of a mile that the meter is operated with the flag in the wrong position. The clock is also stopped because the yieldable member 114 engages the balance wheel 115 thereof.

Assuming that the cab is hired, the driver will manipulate the flag lock control knob 9 thereby to release the flag 7 and flag shaft F for rotation. The detail operation of the flag lock has already been described and therefore the same will not be fully referred to here, it being sufficient to state that when the driver manipulates the knob 9 on the outside of the meter, the knob disk 150 will cause the shifting of the dog 147 to lift the shoulder 146 out of obstructing relation to the projection 145 on the flag locking disk 143.

After the driver releases the flag for operation the same may be pulled from its upright or vacant position and during the first part of its movement, the flag shaft F will:—
(1) release the check pawl 70 to engage with the ratchet 68 of the first fare drum G′;
(2) let pinions 102 move into engagement with gears 90 of fare drums; (3) effect the withdrawal of the combined resetting and keeper levers 94 from the fare drum hearts 91; (4) move check pawl 42$^b$ into engagement with ratchet 42$^a$; (5) operate the cam 109 to let the member 114 rise to set the clock in operation; (6) operate the cam 227 to throw the paid miles clutch members 242 and 243 together to cause the registration of paid miles on the units; (7) cause the operation of the trips register Q; (8) cause the tariff dial W to register through the opening 5$^a$ in the shield 5; (9) and also release the extras registering mechanism to be manipulated by the knob 8 so that the driver can ring up the necessary extras; (10) actuate through the cams 130 and 131, the shifting blades 126 and 127 thereby to snap the shifter arm 123 downward, the same carrying therewith the shifter member 54 to actuate master cam 27.

Also the shifting of master cam 27 will instantly effect the following operations:—(1) connect the driving means A with the star wheel unit by causing gear 28 to engage with gear 31; (2) lower the main actuating lever D thereby to place the lug 63 in contact with the collar 46 of the restraining disk 45 and also, (3) according to the present construction, lower the lever 35ᵇ into engagement with the clock driven gear 42 of the star wheel unit so that the latter may be driven by either the clockwork or the driving means A according to whether the vehicle travels immediately or waits out its initial charge; (4) renders lever 38 capable of operation for throwing the clock idler 36 into engagement with clock driven gear 42 on the completion of the initial charge; (5) and release the extras check pawl 170 by moving abutment 175 away from the nose 174; (6) operates shutter 191.

The operation of the star wheel unit C by either the vehicle or the clock will rotate the restraining collar 45 until the notch 47 registers with the lug 63 whereupon the lug will drop through the notch and permit the lever D to have its full stroke to actuate the lever E and consequently move the first fare drum G'. The continued operation of the cab either traveling or waiting will therefore be registered on the fare drums until the trip is ended.

As the flag moves back to its initial position, that is toward the end of its cycle the previously enumerated operations again instantly occur, but reversely to disengage the parts, and the flag lock lever 143 will move the pin 144 into engagement with the corner 159ᵃ of the body of the dog 147 to shift the shoulder 146 into obstructing relation to the projection 145 so that the flag shaft F cannot continue further into the next cycle without the manipulation of the flag controlling knob 9. The return of the flag to the end of its cycle releases the flag lock so that it in turn can be operated to release the flag for movement to the next cycle.

Without further description it is thought that the features and advantages of the invention will be readily apparent to those skilled in the art, and it will, of course, be understood that changes in the form, proportion and minor details of construction may be resorted to without departing from the spirit of the invention or scope of the appended claims.

We claim:—

1. A taximeter including a flag shaft indicating device, actuating means therefor comprising a star wheel unit and drop levers, clock and wheel driven instrumentalities for operating the star wheel unit of said actuating means, separate clutch levers for respectively controlling the connecting and disconnecting of said instrumentalities with the star wheel unit, a single master cam moved back and forth relative to the flag shaft during the cycle of the flag shaft for controlling the operation of the drop levers and said separate clutch levers.

2. A taximeter including indicating devices, actuating means therefor comprising a star wheel unit and drop levers, clock and wheel driven instrumentalities for operating the star wheel unit of said actuating means, separate clutch levers for respectively controlling the connecting and disconnecting of said instrumentalities with the star wheel unit, a rotatable flag shaft, a master cam loosely mounted on said rotatable flag shaft, and means operated by the flag in its cycle for oscillating said master cam.

3. A taximeter including indicating devices, actuating means therefor comprising a star wheel unit and drop levers actuated thereby, clock and wheel driven instrumentalities for operating the star wheel unit of said actuating means, separate clutch levers for respectively controlling the connecting and disconnecting of said instrumentalities with the star wheel unit, a rotatable flag shaft, a master oscillating cam loosely mounted on the flag shaft, oscillatable shifter means also loosely mounted on the flag shaft and connected to said cam, and means controlled by said flag shaft for operating said oscillatable shifter means.

4. A taximeter including indicating devices, actuating means therefor, means for operating said actuating means, and flag operated means for controlling the connecting and disconnecting of said last named means from the said actuating means, said flag operated means comprising a rotatable flag shaft, an oscillatable controlling unit, and means for instantaneously operating said unit in one direction near the beginning and end of each cycle of the flag shaft.

5. A taximeter including indicating devices, actuating means therefor, means for operating said actuating means, and flag operated means for controlling the connecting and disconnecting of said last named means with and from the actuating means, said flag operated means comprising a rotatable flag shaft, and an oscillating controlling unit including a master controlling cam and a shifter member both of which are loosely mounted on the flag shaft, and means controlled by the movement of the flag during its cycle for moving said shifter member.

6. A taximeter including indicating devices, actuating means therefor, means for operating said actuating means, and flag operated means for controlling the connecting and disconnecting of said last named means with and from the actuating means, said flag operated means comprising a rotatable flag shaft, a master controlling cam loosely mounted on the flag shaft and means for shifting said cam including an arm disposed radially with reference to said flag shaft, and means controlled by the movement of the flag during its cycle for shifting said arm.

7. A taximeter including indicating devices, actuating means therefor, means for operating said actuating means, and flag operated means for controlling the connecting and disconnecting of said last named means with and from the actuating means, said flag operated means comprising a rotatable flag shaft, a master controlling cam loosely mounted on the flag shaft and means for shifting said cam including an arm disposed radially with reference to said flag shaft, a pair of spring tensioned blade members engaging said arm, and means on the flag shaft for moving said blade members to shift the same.

8. A taximeter including indicating devices, actuating means, means for operating said actuating means, and flag operated means for controlling the connecting and disconnecting of said last named means with and from the said actuating means, said flag operated means comprising a rotatable flag shaft, a master controlling cam loosely mounted on the shaft and means for shifting said cam including an arm disposed radially with reference to said flag shaft, a pair of blade members arranged on opposite sides of said arm and adapted to engage therewith, a spring for drawing said blade members together, and separate cams on the flag shaft for tensioning and releasing said blade members thereby to move the arm.

9. A taximeter including indicating devices, actuating means therefor, means for operating said actuating means, and flag operated means for controlling the shifting of the last named means into and out of operative relation to the actuating means, said flag operated means comprising a rotatable flag shaft, a master controlling cam having a plurality of cam projections loosely mounted on said flag shaft, means for limiting the oscillating movement of said cam to a comparatively short arc, an actuator for said controlling cam also loosely mounted on the flag shaft and connected with the cam, and means for converting the rotary movement of the flag shaft into oscillating movement to move said actuator.

10. A taximeter including indicating devices, actuating means including a star wheel unit comprising clock and vehicle driven gears and a heart shaped resetting cam, a lever for engaging said heart shaped cam, a flag shaft, means controlled by the flag shaft for connecting the said actuating means with the fare drums, shifter means for operating said last named means, means operated by the flag shaft for operating said shifter means with an oscillating movement, and cam means operated by said shifter means for moving said lever into and out of engagement with the heart shaped cam.

11. A taximeter including fare drums, drum actuating means including a star wheel unit, means for operating the star wheel unit, a flag shaft, a drop lever actuated by the star wheel unit and comprising a main lever operating in a plane parallel to the plane of operation of the star wheel unit, and a second lever engaged with said main lever and mounted to operate in a plane parallel to the axis of the flag shaft.

12. A taximeter including fare drums, a star wheel unit, a fare drum actuator operated by the star wheel unit and including a main drop lever and another lever mounted at right angles to the main drop lever and directly operating the fare drums, a flag shaft for imparting movement to said star wheel, the said star wheel and main drop lever operating in parallel planes and the other lever and flag shaft also operating in parallel planes at right angles to the main drop lever and star wheel.

13. A taximeter including a main plate, fare drums supported thereon, a bracket plate spaced from the main plate, a star wheel unit including a main shaft journaled in the bracket plate and main plate, a star wheel mounted on the main shaft and operating in a plane parallel to the main plate, vehicle wheel driven means, a flag shaft having its axis at right angles to the main plate, clock driven gearing, a pivoted lever supporting a part of said clock driven gearing, a clutch lever pivoted to the plate and having means for connecting the vehicle wheel driven means with the star wheel unit, and fare drum operating means including a main drop lever also pivoted to the face of the plate.

14. A taximeter including a main plate, a fare drum unit including a frame, fare drums rotatably mounted in the frame and including heart-shaped resetting cams, and gears, a lever supporting shaft and a cam shaft also journaled in the frame, a plurality of resetting levers mounted on said lever shaft and adapted to engage with said heart-shaped resetting cams, springs for tensioning said resetting levers, cams on said cam shaft for actuating said levers, a transfer pinion carrying frame mounted on the lever shaft, a spring for pulling said pinion carrying frame toward the fare drums, cam means on the cam shaft for withdrawing the pinion frame from the fare drums, and means for maintaining the transfer pinions in position to properly engage and disengage with the gears on the fare drums.

15. In a taximeter, fare drums, transfer pinions for the fare drums and a plurality of rectifying plates rigidly connected and yieldingly and pivotally mounted in position to engage with the pinions to rectify the same when withdrawn from the fare drums.

16. A taximeter including a main plate, a fare drum unit supported by said main plate and including a frame, fare drums having gears on the sides thereof, a cam shaft journaled in the frame, a transfer pinion carrying lever mounted in the frame to move toward and from the fare drums under the tension of a spring and a cam on said cam shaft, means for limiting the movement of the transfer pinion carrying lever toward the fare drums, a shaft carried by the lever, pinions having alternate teeth thereof cut away mounted on said shaft, and a pinion rectifying device mounted in said frame and including a rectifying plate for each pinion, each plate having a portion adapted to lie in one of the valleys formed by the cut away teeth of the transfer pinions.

17. A taximeter including a flag shaft having a disk thereon, a pivoted locking dog, an operator's knob controlled disk having dog shifting means thereon, means for permitting the movement of the latter disk in one direction only, and means carried by the dog for correcting the position of the said knob controlled disk.

18. A taximeter including a flag shaft having a locking disk thereon, a pivoted locking dog having at each end thereof, an operator's knob controlled disk having abutments adapted to be engaged by one of the shoulders of the locking dog, dog shifting means also on the knob controlled disk, means permitting the latter disk to rotate in one direction only, and means carried by the dog for correcting the position of the dog shifting means on said knob controlled disk.

19. A taximeter including a flag shaft having a disk thereon, a pivoted locking dog, an operator's knob controlled disk having dog shifting means thereon, means for permitting the movement of the latter disk in one direction only, dog shifting means carried by the disk on the flag shaft, and a wedge shaped member frictionally held to the body of the dog and adapted to be engaged by the dog shifting means on either of the disks and to correct the position of the dog shifting means on the knob controlled disk prior to the contact of said means with the dog.

20. A taximeter including fare drums, actuating means therefor, a flag shaft for controlling said actuating means, and flag locking means for locking the flag shaft at the end of each cycle, said means comprising a knob actuated disk having a pair of peripheral projections, a flag locking disk mounted on the flag shaft and having a peripheral projection, a stud also on the flag locking disk, a pivoted locking dog comprising a body having corner projections and oppositely extending arm portions adapted to be shifted to alternately throw the ends thereof into engagement with the peripheral projection on the flag locking disk and the peripheral projection on the knob control disk.

21. A taximeter including fare drums, actuating means therefor, a flag shaft for controlling said actuating means, and flag locking means comprising a flag disk and a knob disk each provided with peripheral projections and studs projecting from the side faces thereof, a locking dog pivoted at its intermediate portion whereby either end thereof may be brought into obstructing relation to either a flag disk projection or a knob disk projection, a body portion for the dog adapted to be engaged alternately by a stud on the knob disk and the flag disk, and a setting apron frictionally carried by said dog and adapted to be engaged by studs on either of the disks preliminary to said studs striking the body thereof.

22. In a taximeter including a flag shaft having a disk thereon with a locking dog engaging portion, a stud also on the said disk, a knob actuated disk having a dog engaging abutment and an offset pin on the side thereof, and a dog including a body having corner positions adapted to be alternately engaged by the stud on the knob disk and the stud on the flag disk thereby to throw the dog out of the path of the flag disk and into the path of the knob disk, and vice versa, and means frictionally carried by the dog and adapted to be engaged by the stud of one disk to correct the position of the other disk.

23. A taximeter including fare drums, actuating means therefor, a flag shaft for controlling said actuating means, and flag locking means for locking the flag shaft at the end of each cycle, said means comprising a knob actuated disk having a pair of peripheral projections arranged at diametrically opposite points and a pair of studs carried by the side of said disk and also located at diametrically opposite points, the adjacent studs and projections being spaced approximately 90° apart, a flag locking disk on the flag shaft having a peripheral projection, a stud on the flag locking disk, a pivoted dog including a body having corner projections and oppositely disposed arms lying in the planes of the peripheries of the knob actuated disk and the flag locking disk, whereby on a half turn of the knob actuated disk one of the studs thereof will engage a corner of the body of the dog to lift one of the arms out of the path of the projection on the flag locking disk and throw the other arm down into the path of one of the projections on the knob actuated disk, and the movement of the flag at the end of its cycle will cause the flag lock disk to carry its pin into engagement with the other corner of the body of the dog to bring one of the arms thereof in obstructing relation to the flag disk and simultaneously release the knob disk.

24. A taximeter including a back plate, a main interior frame, an extras unit detachably mounted on said frame, a pawl carrying lever mounted at right angles to the axis of the extras drum and adapted to operatively engage the same, a lever carried by the back plate of the meter and arranged at right angles to the pawl carrying lever but operatively connected thereto, and operator actuated means for operating the lever carried by the back of the meter.

25. In a taximeter, a main frame, an extras unit mounted on said main frame and including a fare indicating drum, and an actuating lever having an offset extension, a back plate for the meter connected to the main plate, extras operating means carried by the back plate and including a pivoted lever having a forked portion for interlocking with the extension of said actuating lever, and an operators knob on the back plate of the meter for actuating said last named lever.

In testimony whereof we affix our signatures.

JULIUS GLUCK.
RUDOLPH R. KARICH.